(12) United States Patent
Hwang et al.

(10) Patent No.: US 9,756,121 B2
(45) Date of Patent: Sep. 5, 2017

(54) OPTIMIZING ROUTING AND LOAD BALANCING IN AN SDN-ENABLED CLOUD DURING ENTERPRISE DATA CENTER MIGRATION

(71) Applicant: International Business Machines Corporation, Armonk, NY (US)

(72) Inventors: Jinho Hwang, Ossining, NY (US); Jill L. Jermyn, Stony Brook, NY (US); Maja Vukovic, New York, NY (US); Jin Xiao, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/749,120

(22) Filed: Jun. 24, 2015

(65) Prior Publication Data

US 2016/0381124 A1     Dec. 29, 2016

(51) Int. Cl.
*G06F 15/173*     (2006.01)
*H04L 29/08*     (2006.01)
(Continued)

(52) U.S. Cl.
CPC ............ *H04L 67/101* (2013.01); *H04L 41/12* (2013.01); *H04L 41/145* (2013.01);
(Continued)

(58) Field of Classification Search
CPC . H04L 67/101; H04L 41/145; H04L 43/0817; H04L 41/12; H04L 41/5054; H04L 41/5096
See application file for complete search history.

(56) References Cited

U.S. PATENT DOCUMENTS

2011/0302647 A1*  12/2011  Bhattacharya ...... H04L 63/0263
                                                       726/11
2013/0329734 A1   12/2013  Chesla et al.
(Continued)

FOREIGN PATENT DOCUMENTS

WO     2013186712 A1     12/2013

OTHER PUBLICATIONS

Fragkopoulos, A., "Reducing the Traffic Bottleneck in Cloud-Based Data Management" Innovative Communications Technologies & Entrepreneurship, 10th Semester (Jun. 6, 2013) http://www.publicpolicy.telefonica.com/blogs, 56 pages.

*Primary Examiner* — Padma Mundur
(74) *Attorney, Agent, or Firm* — Scully, Scott, Murphy & Presser, P.C.; Louis J. Percello, Esq.

(57) ABSTRACT

Network routing and load balancing in a software design network (SDN)-enabled computing environment may be provided. Input data discovered from a source computing environment is received, wherein one or more of components of the source computing environment are to be migrated to a target computing environment, the input data comprising at least source configuration information and utilization information. Target compute resources, network design and system management design may be determined based on the input data, and a new network configuration generated as output. Based on these design decisions, the steady-state network management using SDN is proposed. The new network configuration may be transmitted to an SDN controller associated with the target computing environment for storing as flow table rules. The SDN controller pushes the flow table rules to one or more routing switches, the flow table rules for performing the network routing and the load balancing.

15 Claims, 12 Drawing Sheets

(51) Int. Cl.
  *H04L 12/24*   (2006.01)
  *H04L 12/26*   (2006.01)

(52) U.S. Cl.
  CPC ...... *H04L 41/5054* (2013.01); *H04L 43/0817* (2013.01); *H04L 41/5096* (2013.01)

(56)  References Cited

U.S. PATENT DOCUMENTS

2014/0301192 A1    10/2014  Lee et al.
2014/0307556 A1*   10/2014  Zhang ................... H04L 45/302
                                                      370/236
2015/0074276 A1     3/2015  DeCusatis et al.
2015/0163152 A1*    6/2015  Li ....................... H04L 47/2441
                                                      370/409
2015/0309818 A1*   10/2015  Lee .................... G06F 9/45533
                                                      718/1

\* cited by examiner

Hierarchical Load Balancing

```
setLBTable(LB_Servers S, Node N) {
  // N is one above server if (|S| == 0)
    return true;

Foreach ( s in S ) {
    if ( isDecendent(N, s) ) {
      setTable(N, s);
      S = S – s;
    }
  } return (setLBTable(S, N->left) & (setLBTable(S, N->right);
}
```

FIG. 6

OPTIMIZING ROUTING AND LOAD BALANCING IN AN SDN-ENABLED CLOUD DURING ENTERPRISE DATA CENTER MIGRATION

FIELD

The present application relates generally to computers and computer applications, and more particularly to computer communications and networks.

BACKGROUND

Software Defined Networks (SDNs) have been developed as a response to the increasing demand for network capacity in traditional cloud environments. This new approach to networks allows central management of traffic flows. Currently, routes for flows are selected based on current network state (e.g., congestion); however they do not take destination server state or load balancing into consideration. Such routing selection may lead to poor performance and complicated routing procedures, especially in the context of migration to this type of environment from a traditionally networked data center. Additionally, existing practices for load balancing involve separate middleboxes, which may incur high cost and require vendor-specific hardware.

BRIEF SUMMARY

A method and system for network routing and load balancing in a software design network (SDN)-enabled computing environment may be provided. The method, in one aspect, may comprise receiving input data discovered from a source computing environment, wherein one or more of components of the source computing environment are to be migrated to a target computing environment, the input data comprising at least source configuration information and utilization information. The method may also comprise determining target compute resources, network design and system management design based on the input data, and generating a new network configuration as output. The method may also comprise transmitting the new network configuration to an SDN controller associated with the target computing environment for storing as flow table rules, wherein the SDN controller pushes the flow table rules to one or more routing switches, the flow table rules for performing the network routing and the load balancing.

A system for providing network routing and load balancing in a software design network (SDN)-enabled computing environment, in one aspect, may comprise one or more hardware processors. One or more of the hardware processors may be operable to receive input data from a source computing environment, wherein one or more of components of the source computing environment are to be migrated to a target computing environment, the input data comprising at least source configuration information and utilization information. One or more of the hardware processors may be further operable to determine target compute resources, network design and system management design based on the input data, and generate a new network configuration as output. One or more of the hardware processors may be further operable to transmit the new network configuration to an SDN controller associated with the target computing environment for storing as flow table rules, wherein the SDN controller pushes the flow table rules to one or more routing switches, the flow table rules for performing the network routing and the load balancing.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 shows an example hierarchical load balancing algorithm 512 in one embodiment of the present disclosure.

DETAILED DESCRIPTION

Figure 1A:
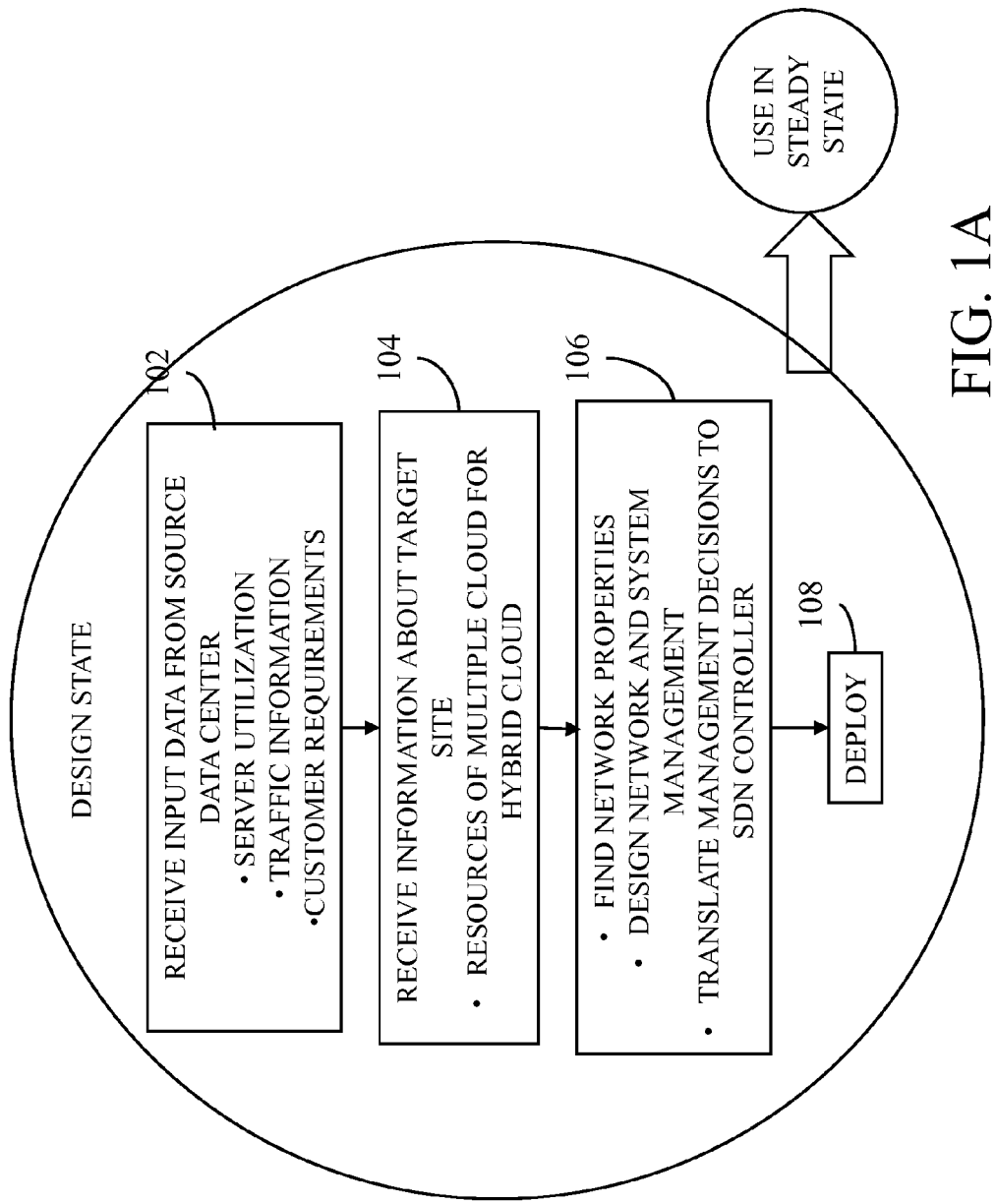
FIGS. 1A and 1B show a flow diagram illustrating an overall process in one embodiment of the present disclosure.

A method, system and/or techniques are presented for performing optimized routing and load balancing in an SDN-enabled cloud during data center migration. In one aspect, a method may include analyzing the source site and making or generating suggestions for load balancing in the target. The method may then design rules for the target SDN controller based on the load balancing proposals. Once migrated, the method may analyze performance and utilization data from servers and allow the controller to make routing decisions based on both network and server state. Such an approach can improve performance and security and reduce cost in the target environment.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Software Design Network (SDN) refers to a computer networking approach in which network services may be managed and supported, for example, centrally by for example, separating control-plane logic from data-plane packet flow transmission in the underlying systems such as switches and routers, and directing how the network traffic should be handled.

In SDN-enabled networks, e.g., data center networks, virtualization technology divides network resources so that customers control their own infrastructure. For example, each customer may manage network infrastructure with its own network applications. In SDN-enabled networks, customers have control over virtualized routers and switches belonging to cloud providers. In this way, SDN-enabled networks are different from legacy networks in which customers do not have control over legacy routers and switches belonging to cloud providers and each customer may manage only its own network appliances with rules.

A method, system and/or techniques described herein may be implemented or embodied as a design tool for example, and may optimize end-to-end network management and design in a Software Design Network (SDN)-enabled hybrid cloud during and after migration between hybrid computing environments.

Figure 1B:
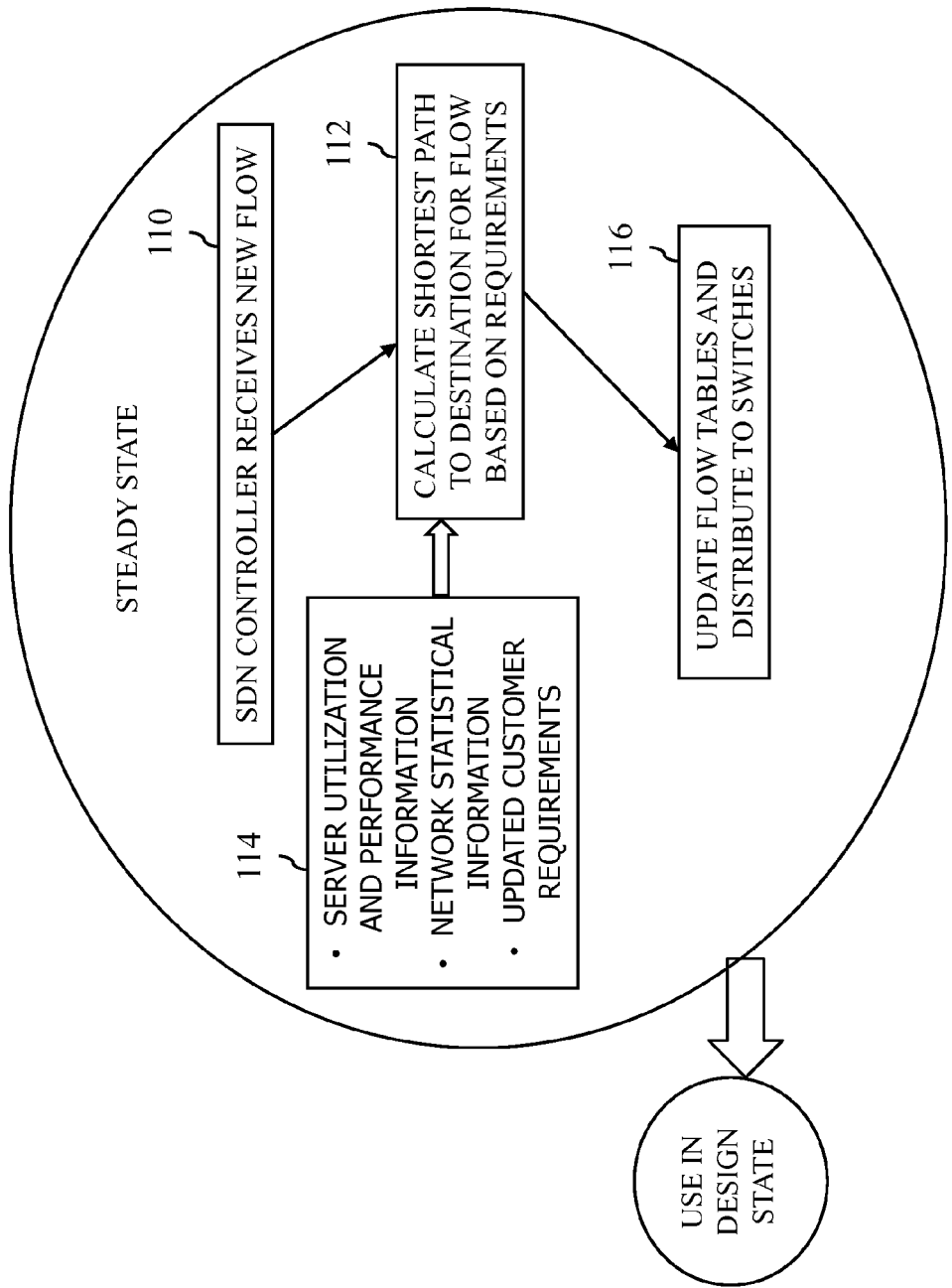

FIGS. 1A and 1B show a flow diagram illustrating an overall process in one embodiment of the present disclosure. FIG. 1A shows a process flow associated with a design state, for example, pre-migration (e.g., discover network properties, design the network) of data center (e.g., one or more servers and other resources) or information technology (IT) infrastructure.

At 102, input data is received from source computing infrastructure, for example, source data center. For example, the method in one embodiment may include receiving an input with a source configuration (e.g., a list of load balancers or load balanced servers, firewalls and firewall rules, customer requirements, and/or others) and utilization and/or behavior information about an existing system that is to be migrated. Examples of the utilization and/or behavior information may include one or more of list of server and resource utilization and/or configurations, criticality of servers, traffic information, server connectivity, network connectivity (groups), QoS (service level agreement (SLA)) requirements.

At 104, information about a target site is received. The target sites can include public cloud providers such as IBM SoftLayer™ or AMAZON Web Service (AWS). For example, information about target resources of multiple clouds for hybrid cloud may be received.

At 106, based on the information received, target compute resources, network design and system management design may be recommended. Management decisions, e.g., the target compute resources, network design and system management design, may be translated to SDN controller, which pushes flow table rules to switches. The target compute resources, network design and system management design, e.g., generated into a new network configuration may be stored as one or more flow table rules. Flow table rules, for example, may control how to steer packet flows and manage thresholds for network link performance.

For example, at 106, system and network configuration may be optimized and new network configuration provided as output. In one embodiment, the output is the result of resource optimization according to discovered resources, target deployment plan, and network design. For example, given the deployment plan as a graph format, the shortest path within quality of service guarantee could be the output. Other examples of the network configuration output may include one or more of selection of system and network, resources, assets, physical and/or virtual connections to servers, connection paths, connection path lengths, physical location of assets (e.g., memory, central processing unit, and/or others), firewall design, mix of public and private cloud network allocation, and network security. For example, particular network management may be recommended or suggested that may optimize system and network resources, e.g., load balancing, firewall, security, intrusion detection system (IDS), quality of service (QoS)) for the target, cost (computing resources), based on source configuration, behavior information, and target environment. SDN controller rules may be devised to reflect end-to-end network management requirements.

At 108, the migration design with a combination of resources and network design may be deployed, for example, to migrate the computing infrastructure to a target site according to the design parameters.

In one aspect, the SDN controller uses the flow table rules updated with the configuration determined during the design state in steady state, for example, shown in FIG. 1B.

In one aspect, the method may be repeated (e.g., upon event occurrence or periodically) for a migration of the system and may periodically send performance, utilization information, and changing customer requirements to an SDN controller so that the controller updates routing decisions based on states of both network and server elements. For example, once servers are placed in the target, the method may include periodically sending performance, utilization information, and changing customer requirements to the SDN controller. In one embodiment, the controller updates routing decisions based on the state of both network and server elements.

FIG. 1B shows a flow process associated with a steady state, for example, after the migration is performed in one embodiment of the present disclosure. During post-migration (steady-state operations), servers may report utilization, performance information (e.g., response time, resource utilization, and number of transactions), and changed customer requirements to the SDN controller. The SDN controller may make flow decisions based on states of the network elements and servers. At 110, an SDN controller receives a new flow, for example, defined in the network design phase at 106. At 112, shortest path to destination for the flow may be determined based on requirements shown at 114. The requirements 114 may include server utilization and performance information, network statistical information, and updated customer requirements. For instance, the information 114 may be received from the migrated servers, for example, periodically. At 116, the SDN flow tables may be updated and distributed to SDN switches, for example, via a communications protocol that provides access to a control plane of a network switch or router over a network. An example of such communications protocol includes OpenFlow. The updated flow tables may be used when a same flow arrives at switches again.

A system in one embodiment of the present disclosure may provide the most suitable network design to adapt the SDN-enabled data centers based on the network requirements, the resource deployments and target VM configuration. As an example, the system of the present disclosure may be embedded as part of the cloud migration orchestrator functionality, as part of the cloud management system (e.g., to continuously reconfigure the application) and enable customer-driven control of the network.

The system, method and/or techniques of the present disclosure in one embodiment provides for an automated end-to-end optimized network management (e.g., routing, firewall, load balancing, IDS) in a system such as a cloud and/or hybrid cloud and between computing environments based on server information, network state, and customer requirements, and provide for enhanced customer control in a cloud, e.g., hybrid cloud environment.

The system, method and/or techniques of the present disclosure in one embodiment allow network management to easily and readily adapt to changing business needs, increase performance in or over data centers, and allow for a new approach for migration to a future cloud architecture.

In one embodiment of the system, method and/or techniques of the present disclosure, decisions are made in an SDN controller to reflect current server state, best paths are calculated using, e.g., two sources of information, and no middleboxes may be necessary.

In one aspect, the method, system and/or techniques of the present disclosure provide for an optimized path management in the SDN switches, for example, spanning from the migration design to the steady-state network and resource configuration management, for example, based on the status of network traffic and the server computing resources. The method, system and/or techniques of the present disclosure in one embodiment try to optimize the entire resource usage and the network flow management, for example, based on the status of network traffic and the server computing resources. In the method, system and/or techniques of the present disclosure in one embodiment, performance and utilization information may be periodically sent to the SDN controller before and/or after migration, and the routing paths may be updated by using the controller based on state of both network and server elements. The method, system and/or techniques of the present disclosure in one embodiment take into consideration steady-state network and resource management. In one embodiment, the method, system and/or techniques of the present disclosure may proactively monitor the entire network and make decisions on the network and resource configuration without moving resources.

Figure 2:
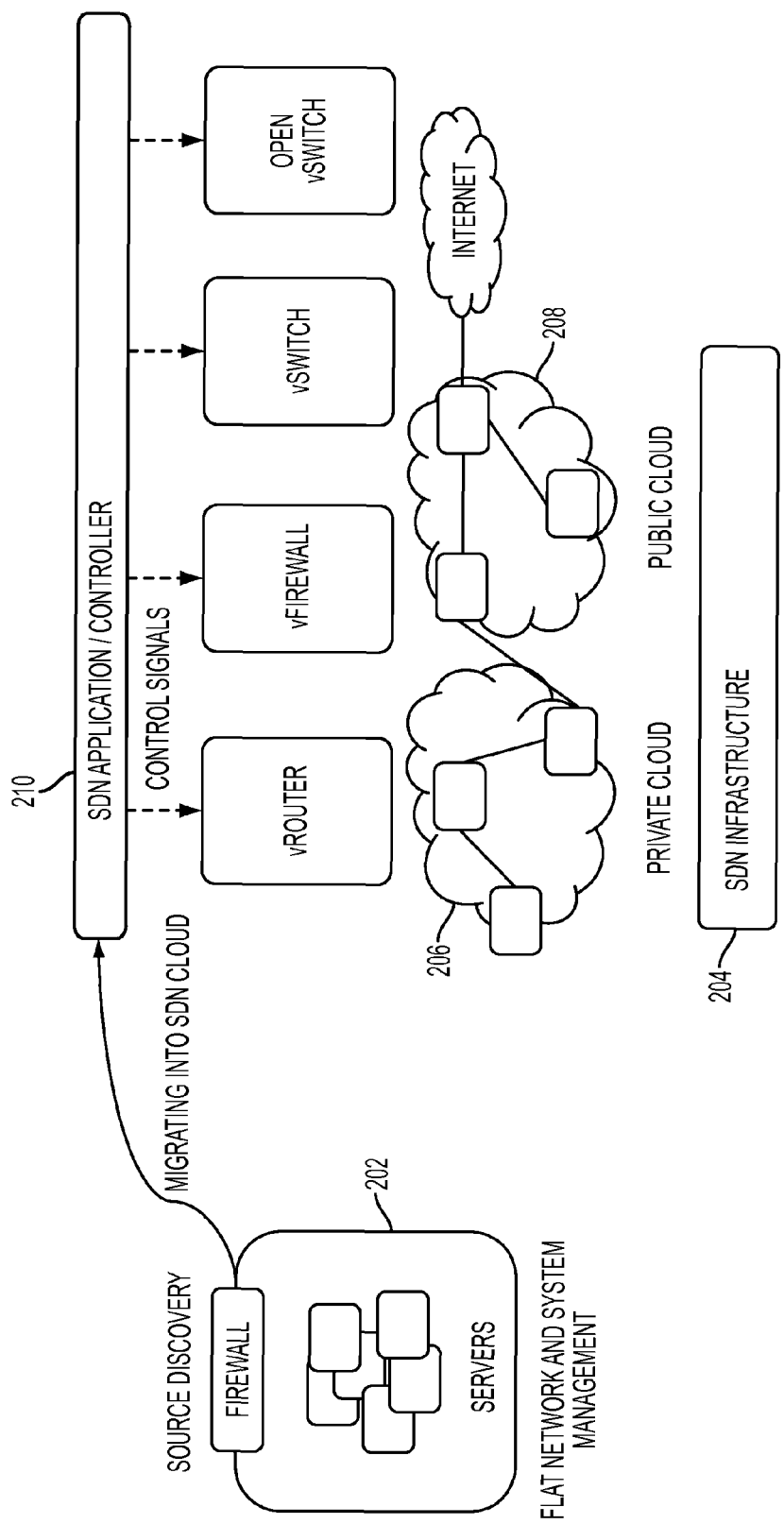
FIG. 2 is a diagram illustrating an overview of migrating into an SDN computing environment in one embodiment of the present disclosure.

FIG. 2 is a diagram illustrating an overview of migrating into an SDN computing environment in one embodiment of the present disclosure. A source system 202 for migration may include one or more servers with a firewall, and may implement flat network and system management. For migration, source discovery may be performed to discover information for migration, e.g., a list of server and resource utilization/configurations, criticality of servers, traffic information, network connectivity (groups), QoS (SLA) requirements, and/or others.

The source system may be migrated to a target site in a hybrid computing environment, e.g., including a private cloud 206 and a public cloud 208. The hybrid computing environment, e.g., implements an SDN infrastructure 204. The hybrid cloud also could mean that there may be multiple cloud providers. An SDN application/controller 210 in the hybrid computing environment may perform resource management in the hybrid computing environment, network path management and QoS (SLA) management. While legacy cloud network may be controlled only with the IP addresses (flat management) in the distributed network elements, SDN-enabled hybrid cloud can provide more holistic control with a centralized view of the entire network, which allows the cloud customers to handle diverse network complexity (management of computing resources and network together).

Figure 3:
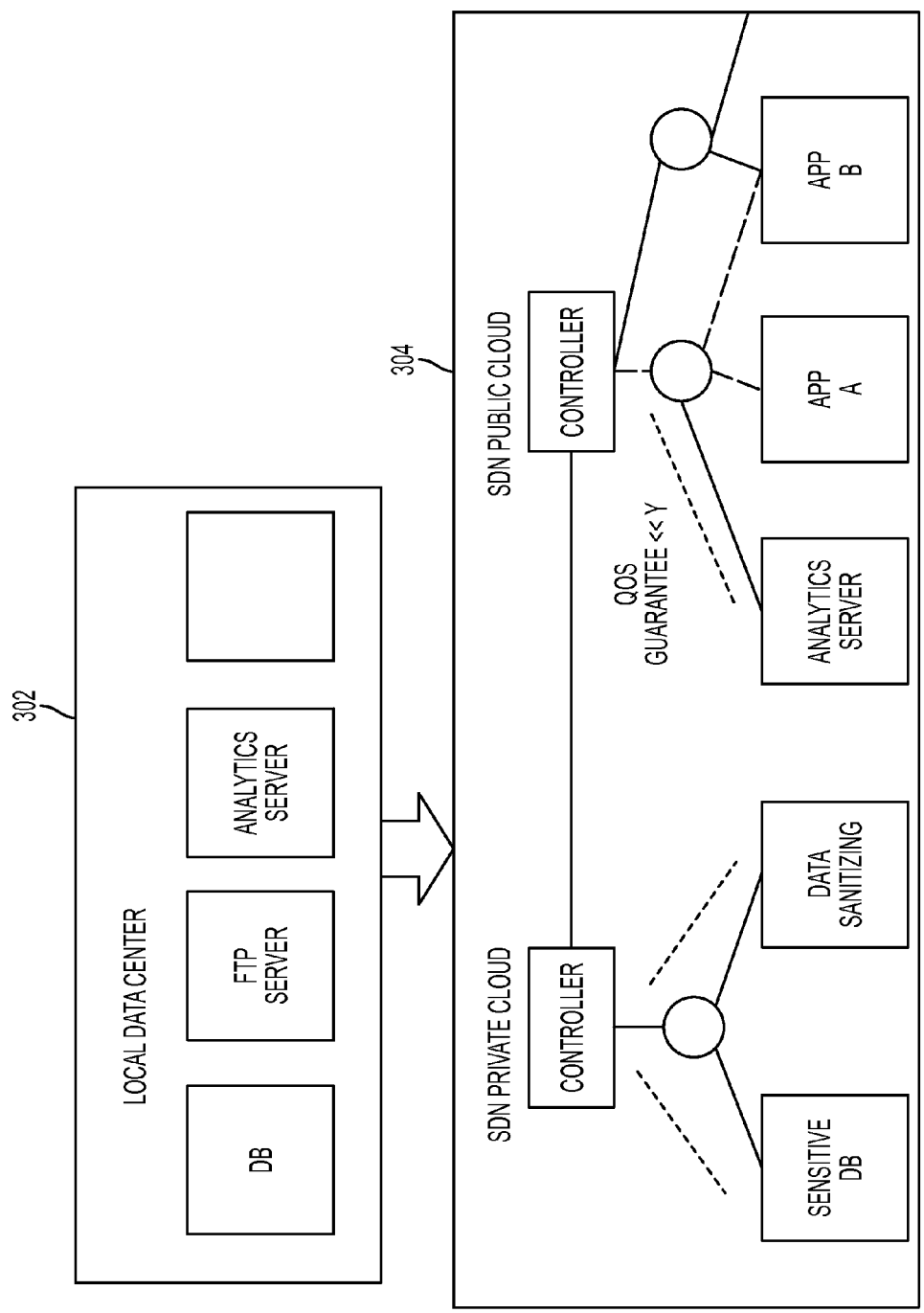
FIG. 3 is a diagram that illustrates designing end-to-end network and system resources in one embodiment of the present disclosure.

FIG. 3 is a diagram that illustrates designing end-to-end network and system resources in one embodiment of the present disclosure. A local data center 302 may be selected for migration to another computing environment, for example, a hybrid computing environment 304. In one embodiment of a method of the present disclosure, input information such as QOS (SLA), security requirements e.g., security sensitivity of a component (e.g., security sensitive database (DB), whether to isolate servers with critical company data stored or to sanitize data before reaching public cloud, and other information may be received. Based on the information, corresponding target components and configuration, and types of cloud environment (e.g., public or private cloud) may be determined for the local data center components for migration.

Figure 4A:
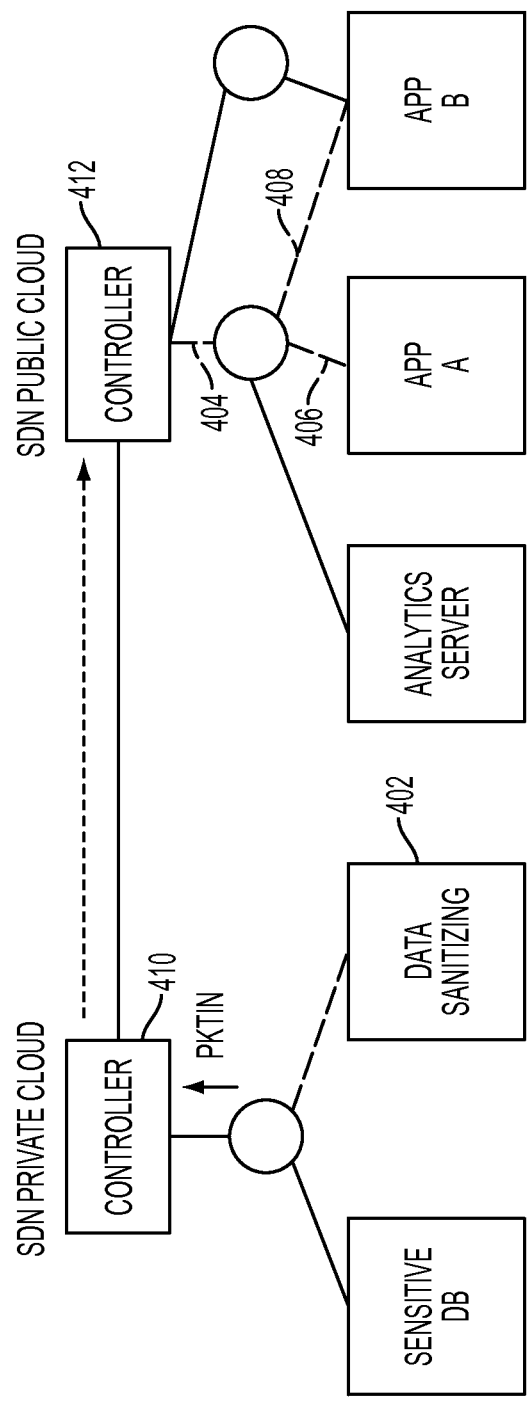
FIGS. 4A and 4B illustrate another example of designing end-to-end network and system resources in one embodiment of the present disclosure.
Figure 4B:
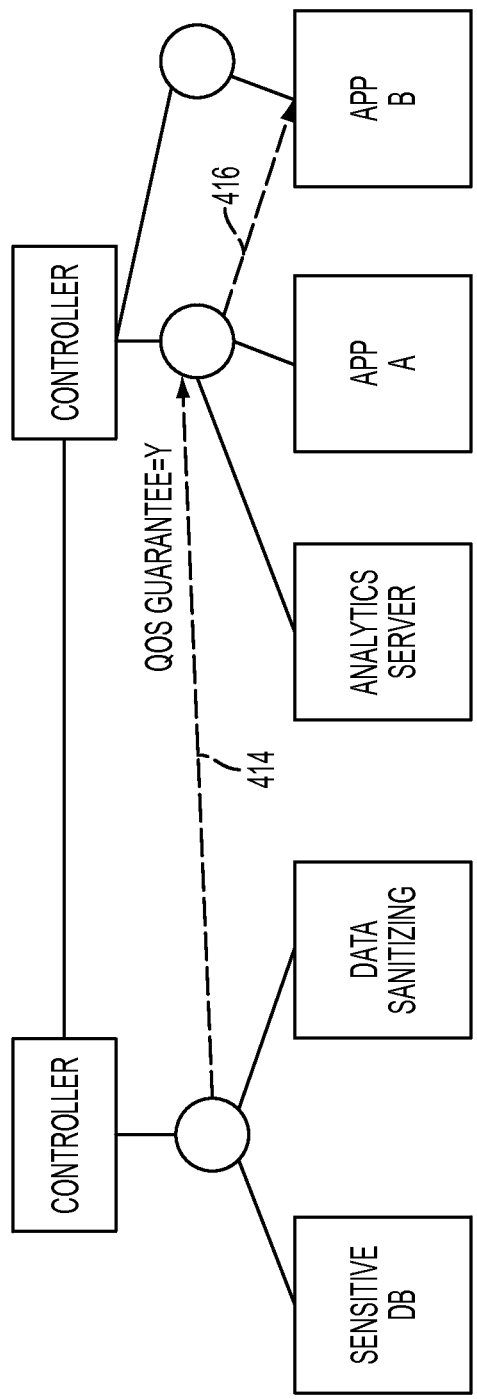

FIGS. 4A and 4B illustrate another example of designing end-to-end network and system resources in one embodiment of the present disclosure, for example, when resources are deployed in both private and public hybrid cloud environment. FIG. 4A shows the control plane actions when a packet flow comes into the network (here, links at 404, 406, 408 are for possible paths to the application). The first packet from data sanitizing server 402 is sent to the private controller 410 in the private cloud and then delivered to the controller 412 in the public cloud. Both controllers 410, 412 set the optimized network flows into the network elements under the control. FIG. 4B shows how the network flows are steered when the control is set with the QoS guarantee. The links at 414 and 416 show possible paths to the application.

The algorithm in Table 1 illustrates server-criticality and SLA based resource management algorithm in one embodiment of the present disclosure.

TABLE 1

Input: Server si (total number N), server criticality ci where i is i-th server,
connected servers Qi and SLA requirements aij where i and j are i-th server and j-th server, respectively.
Environments: R is a private cloud, and U is a public cloud
Variables: n = 0 (number of servers placed)
For each si
  if si in R or si in U
    continue
  if ci == high
    Place si in R
    n = n + 1

TABLE 1-continued else
  for each sj in Qi
    if aij cannot be satisfied with SLA(R − U) // should put in the same
    cloud
      if cj == high
        Place si and sj in R
      else
        Place si and sj in U
      n = n + 2
    else // could put in the different cloud
      Place si in U
      if cj == high
        Place sj in R
      else
        Place si in U
      n = n + 2
if n == N
  break The above algorithm determines which target computing environment or component a source component should be migrated in based on resource properties and security requirements. This is used when the migration planning is executed in the pre-migration stage.

The following describes multiple weight source shortest path algorithm in one embodiment of the present disclosure. Server utilization and performance information may be added to all incoming edges to that server. For example, in the steady-state mode shown in FIG. 1B, when a new flow comes in and no specific flows are found for the flow, the shortest paths are calculated and one of them may be selected based on an SLA.

The following Dijkstra's Shortest Path may be performed.
1. Assign to every node a tentative distance value: set it to zero for initial node and to infinity for all other nodes.
2. Mark all nodes unvisited. Set the initial node as current. Create a set of the unvisited nodes called the unvisited set consisting of all the nodes.
3. For the current node, consider all of its unvisited neighbors and calculate their tentative distances. Compare the newly calculated tentative distance to the current assigned value and assign the smaller one.
4. When all the neighbors of the current node are considered, mark the current node as visited and remove it from the unvisited set.
5. If the destination node has been marked visited or if the smallest tentative distance among the nodes in the unvisited set is infinity, then stop. T
6. Select the unvisited node that is marked with the smallest tentative distance, and set it as the new "current node" then go back to step 3.

Figure 5:
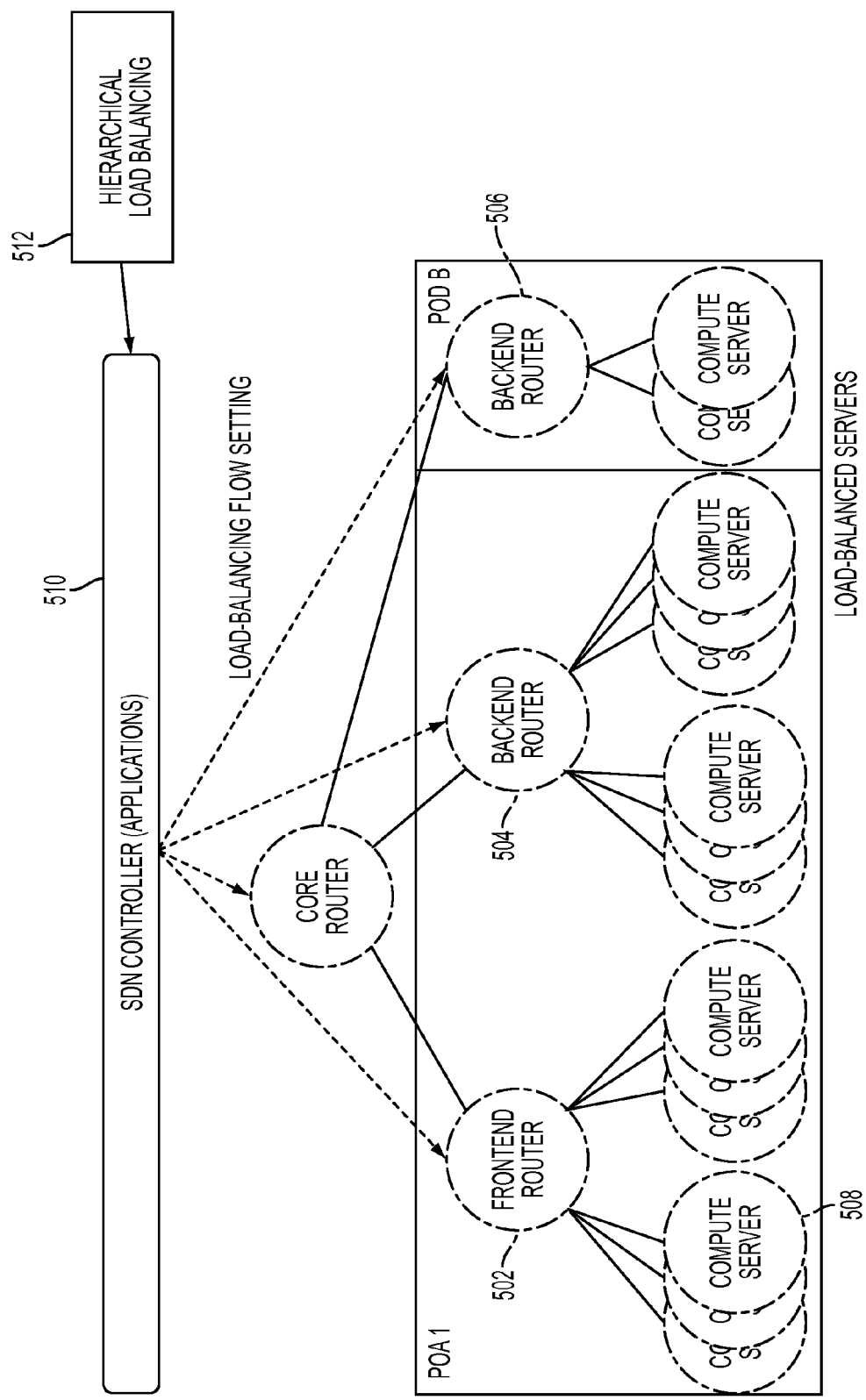
FIG. 5 is a diagram illustrating tree based hierarchical load steering in one embodiment of the present disclosure.

FIG. 5 is a diagram illustrating tree based hierarchical load steering in one embodiment of the present disclosure. SDN applications (shown as part of SDN controller 510) may include customer network applications, e.g., performing network algorithms such as traffic engineering, QoS, monitoring, and routing. Internal nodes represent network elements with SDN communications protocol (e.g., OpenFlow) compatibility (e.g., 502, 504, 506). Leaf nodes 508 represent compute servers. An SDN controller 510 may perform a decision on a load balancing flow table, e.g., by running a hierarchical load balancing algorithm 512. FIG. 6 shows an example hierarchical load balancing algorithm 512 in one embodiment of the present disclosure. For example, in the steady-state flow management shown in FIG. 1B, when the links are overloaded with overwhelmed traffic requests, the SDN controller makes a decision on the load balancing, e.g., it places a flow table alternatively for load-balanced compute resources. For example, when a web service is load-balanced, multiple web servers can receive requests. In this case, the SDN controller alternates the flows between those web servers in order to balance the overall loads.

Figure 7A:
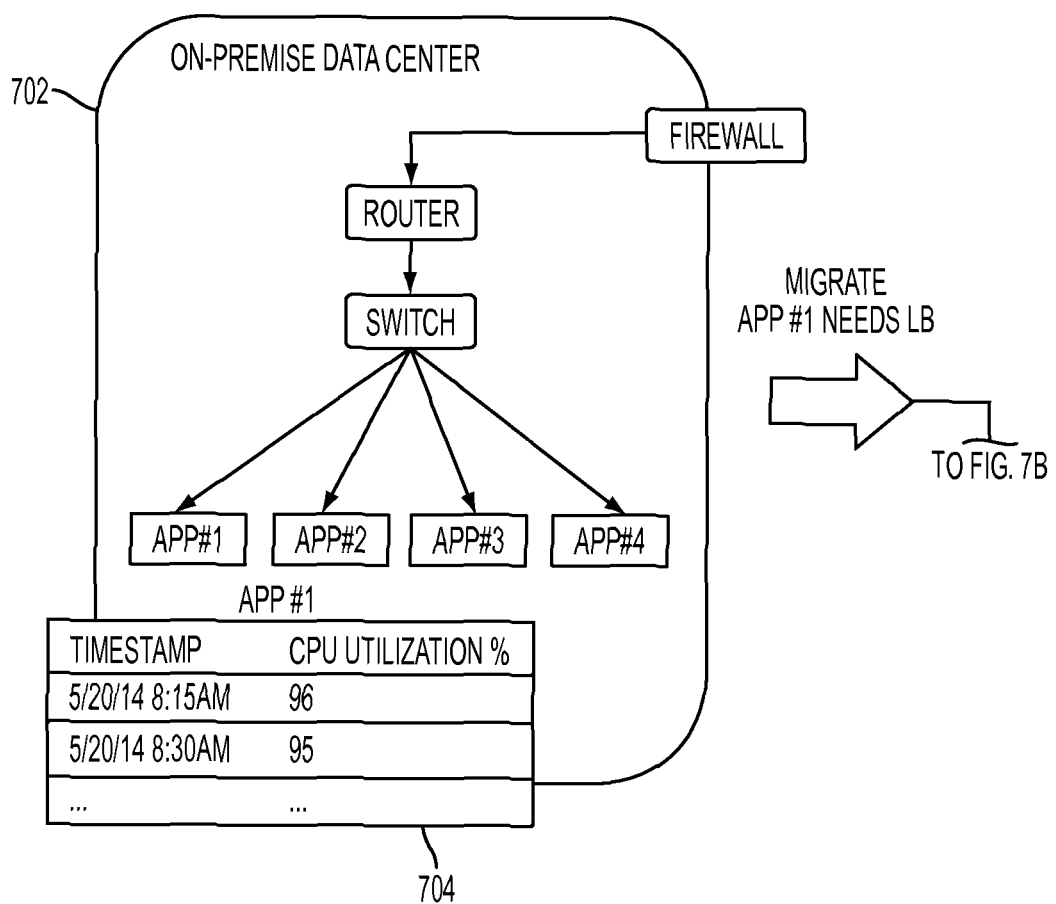
FIGS. 7A and 7B show a diagram illustrating a high level overview of a process in one embodiment of the present disclosure.
Figure 7B:
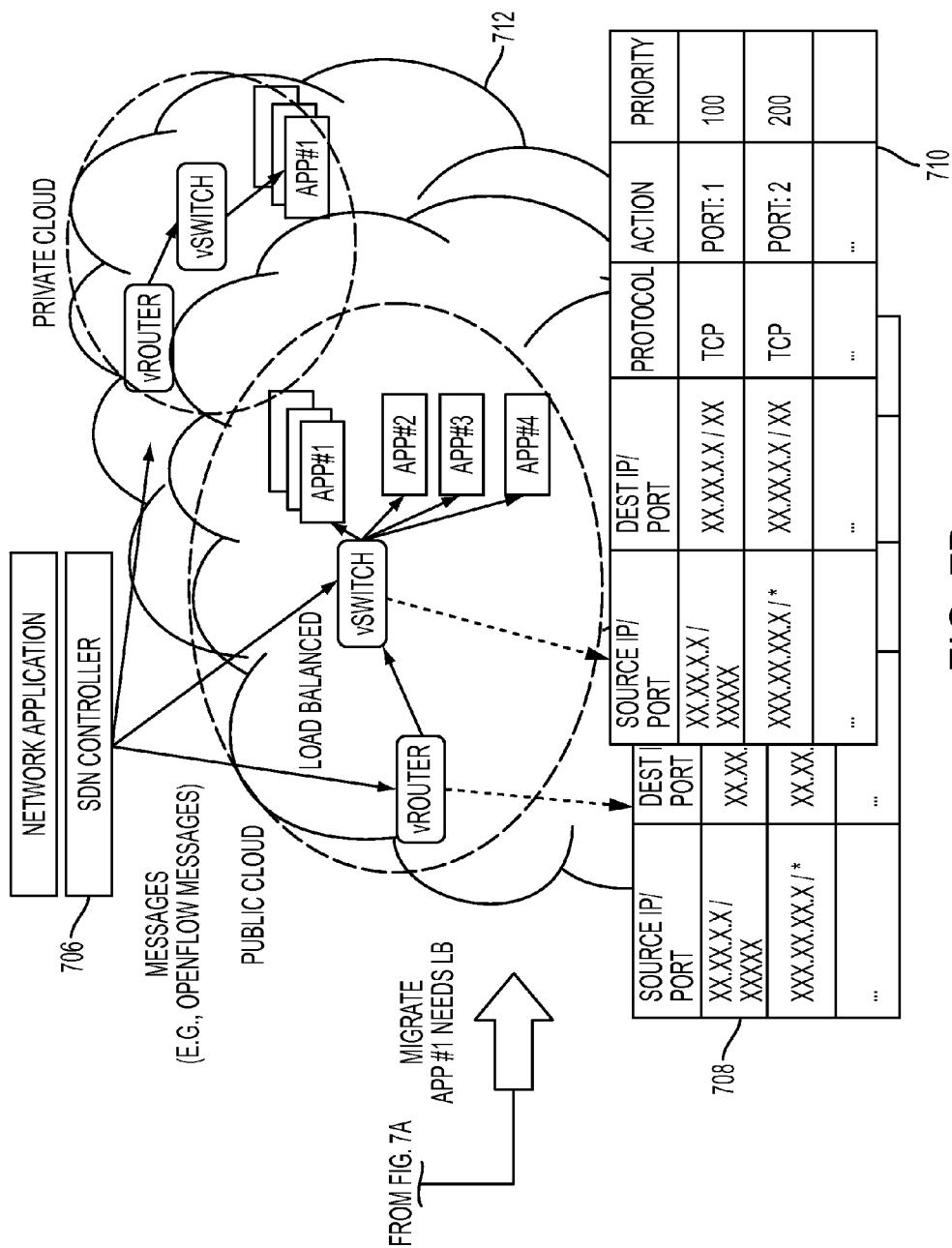

FIGS. 7A and 7B show a diagram illustrating a high level overview of a process in one embodiment of the present disclosure. Network flows are managed through flow tables controlled by SDN controller in one embodiment. A data center 702 may include an IT infrastructure that may include a firewall, router, switch and a plurality of applications. Consider that App #1 is selected for migration. The data center may have information such as central processing unit(s) utilization 704, for example, stored in a database table or in any other form.

As described with reference to FIGS. 1A and 1B, information about the data center may be received and based on the information, compute resources, target network and system management design may be recommended. The management decisions are translated to SDN applications and are fed into SDN controller 706, and control the network devices such as switches and routers. The SDN controller 706 may push flow table rules (e.g., 708, 710) to routers and switches (e.g., via virtual routers and virtual switches) in a provider's network infrastructure (e.g., cloud computing environment 712). vRouters and vSwitches managed by customers' SDN applications/controller, for example, communicates through OpenFlow protocol (control-plane management) in order to provide a data-plane management. In one embodiment, SDN applications running on the SDN controller performs the decision logic.

Figure 8:
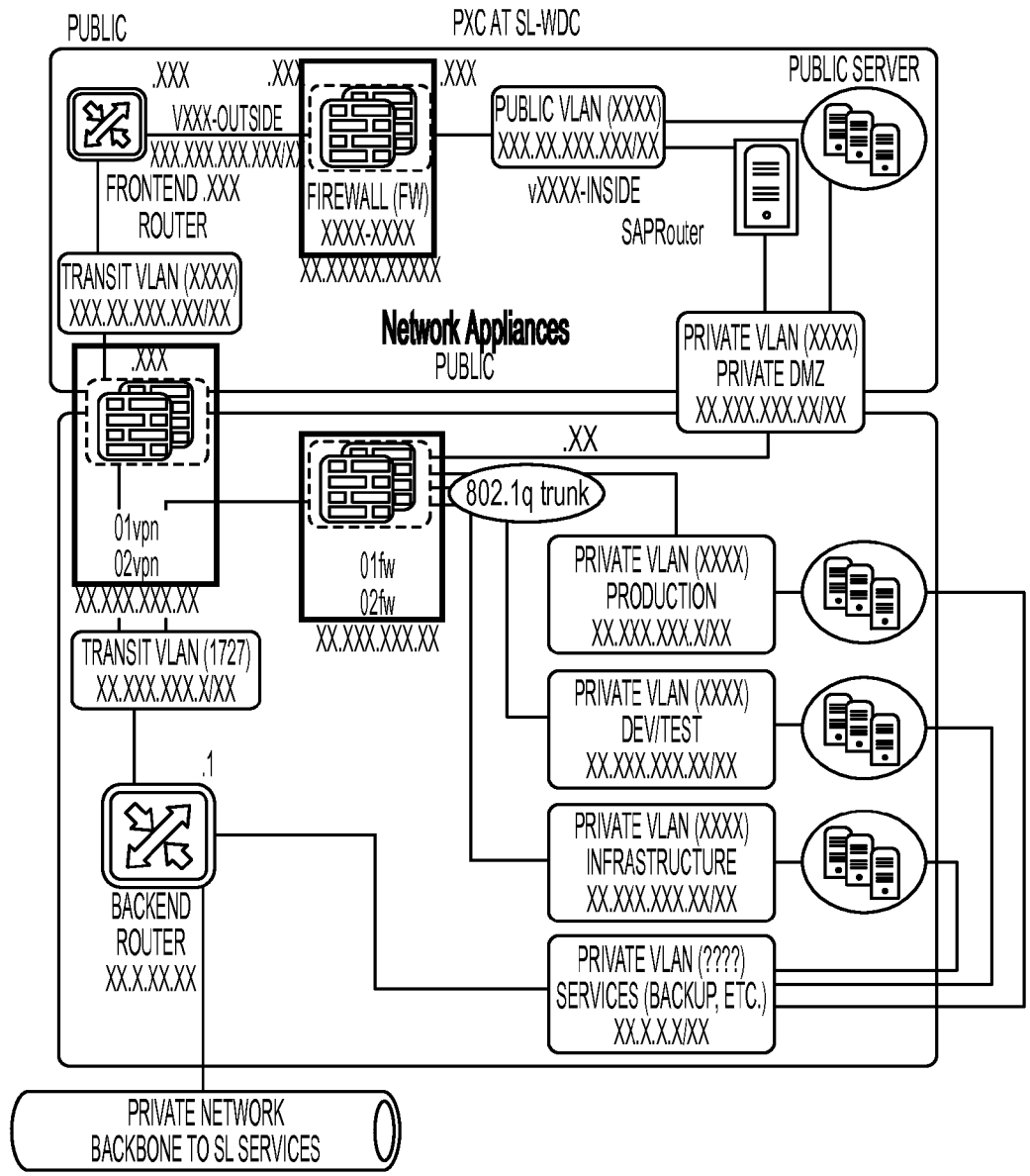
FIG. 8 shows an example of a network design in a data center pod.

FIG. 8 shows an example of a network design in a data center. A pod, for example, refers to a standardized facility design. Data center facilities may feature one or more pods, each built to the same specification that supports a number of servers. A pod may have two routers (frontend router and backend router) that divide network space into public network (e.g., public IPs with VLAN) and private network (e.g., 10.x.x.x IPs with VLAN). FIG. 8 shows one example of enterprise network design, e.g., which may be implemented via a methodology of the present disclosure in one embodiment.

Figure 9:
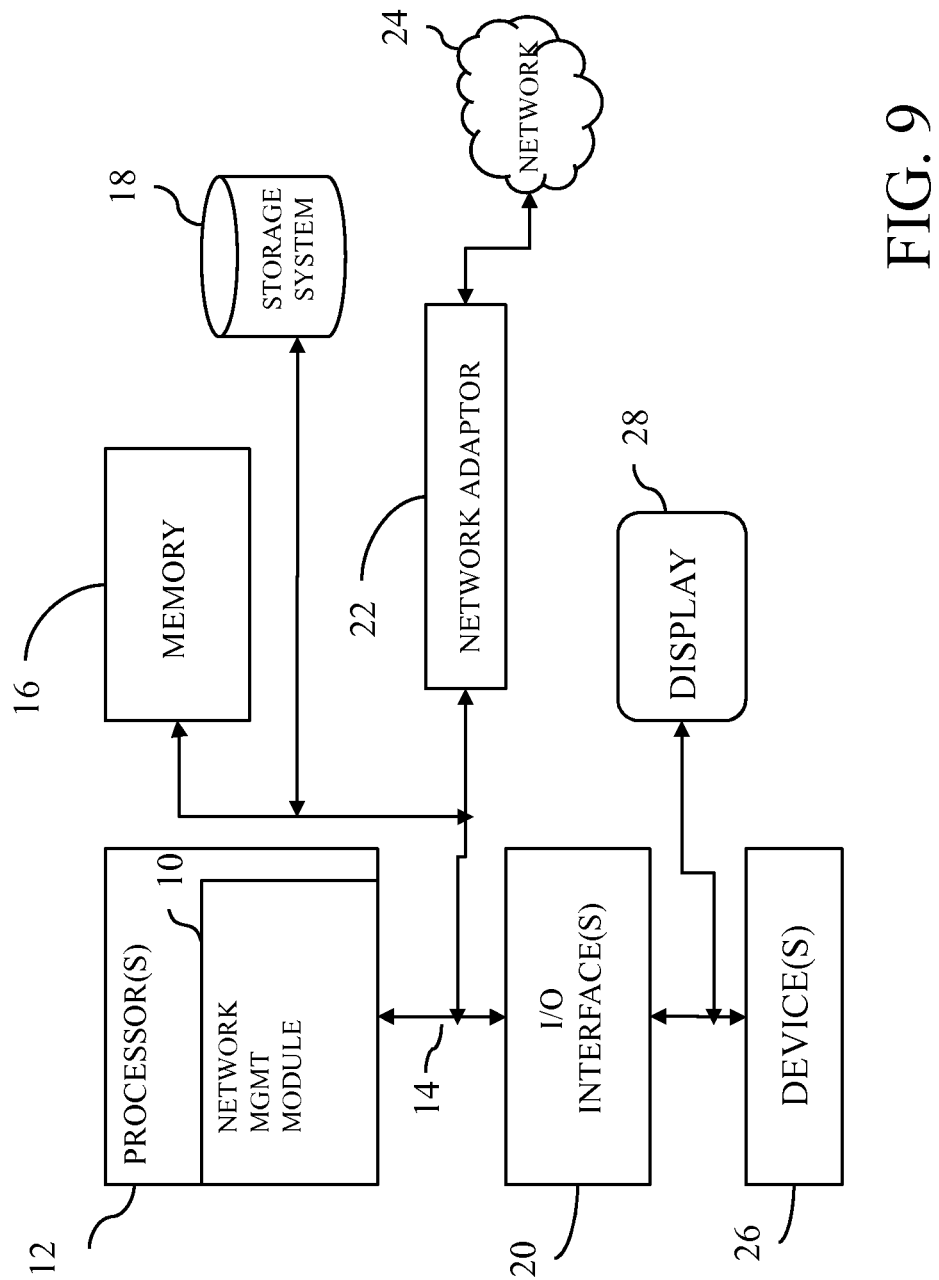
FIG. 9 illustrates a schematic of an example computer or processing system that may implement a network management system in one embodiment of the present disclosure.

FIG. 9 illustrates a schematic of an example computer or processing system that may implement a network management system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a network management module 10 that performs the methods described herein. The network management module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of network routing and load balancing in a software design network (SDN)-enabled computing environment, comprising:
   receiving input data discovered from a source computing environment, wherein one or more of components of the source computing environment are to be migrated to a target computing environment during a data center migration, the input data comprising at least source configuration information and utilization information including at least criticality of servers and a list of server and resource utilization and configurations;
   determining target compute resources, network design and system management design based on the input data, and generating a new network configuration as output; and
   transmitting the new network configuration to an SDN controller associated with the target computing environment for storing as flow table rules, the new network configuration comprising selection of network, resources, assets comprising at least memory and central processing unit, physical and virtual connections to servers, connection paths, connection path lengths, physical location of the assets, firewall design, mix of public and private computing infrastructure's network allocation, and network security translated into the flow table rules, wherein the SDN controller pushes the flow table rules to one or more routing switches, the flow table rules for performing the network routing and the load balancing.

2. The method of claim 1, further comprising receiving from one or more of the components migrated to the target computing environment, performance and utilization information associated with the components running on the target computing environment, and transmitting the performance and utilization information to the SDN controller for updating the flow table rules.

3. The method of claim 2, wherein the receiving the performance and utilization information from one or more of the components migrated to the target computing environment and transmitting the performance and utilization information to the SDN controller are repeated periodically.

4. The method of claim 2, wherein changing customer requirements are received from the components migrated to the target computing environment, wherein the SDN controller updates the flow table rules further based on the changing customer requirements.

5. The method of claim 1, wherein the input data further comprises one or more of a list of load balanced servers, firewall rules, customer requirements, traffic information, server connectivity, network connectivity and quality of service (QoS) requirements.

6. A non-transitory computer readable storage medium storing a program of instructions executable by a machine to perform a method of network routing and load balancing in a software design network (SDN)-enabled computing environment, comprising:
   receiving input data from a source computing environment, wherein one or more of components of the source computing environment are to be migrated to a target computing environment during a data center migration, the input data comprising at least source configuration information and utilization information including at least criticality of servers and a list of server and resource utilization and configurations;
   determining target compute resources, network design and system management design based on the input data, and generating a new network configuration as output; and
   transmitting the new network configuration to an SDN controller associated with the target computing environment for storing as flow table rules, the new network configuration comprising selection of network, resources, assets comprising at least memory and central processing unit, physical and virtual connections to servers, connection paths, connection path lengths, physical location of the assets, firewall design, mix of public and private computing infrastructure's network allocation, and network security translated into the flow table rules, wherein the SDN controller pushes the flow table rules to one or more routing switches, the flow table rules for performing the network routing and the load balancing.

7. The non-transitory computer readable storage medium of claim 6, further comprising receiving from one or more of the components migrated to the target computing environment, performance and utilization information associated with the components running on the target computing environment, and transmitting the performance and utilization information to the SDN controller for updating the flow table rules.

8. The non-transitory computer readable storage medium of claim 7, wherein the receiving the performance and utilization information from one or more of the components migrated to the target computing environment and transmitting the performance and utilization information to the SDN controller are repeated periodically.

9. The non-transitory computer readable storage medium of claim 7, wherein changing customer requirements are received from the components migrated to the target computing environment, wherein the SDN controller updates the flow table rules further based on the changing customer requirements.

10. The non-transitory computer readable storage medium of claim 6, wherein the input data further comprises one or more of a list of load balanced servers, firewall rules, customer requirements, traffic information, server connectivity, network connectivity and quality of service (QoS) requirements.

11. A system for providing network routing and load balancing in a software design network (SDN)-enabled computing environment, comprising:

one or more hardware processors; and
a memory device coupled to the one or more hardware processors;
one or more of the hardware processors receiving input data from a source computing environment, wherein one or more of components of the source computing environment are to be migrated to a target computing environment during a data center migration, the input data comprising at least source configuration information and utilization information including at least criticality of servers and a list of server and resource utilization and configurations,
one or more of the hardware processors determining target compute resources, network design and system management design based on the input data, and generating a new network configuration as output,
one or more of the hardware processors transmitting the new network configuration to an SDN controller associated with the target computing environment for storing as flow table rules, the new network configuration comprising selection of network, resources, assets comprising at least memory and central processing unit, physical and virtual connections to servers, connection paths, connection path lengths, physical location of the assets, firewall design, mix of public and private computing infrastructure's network allocation, and network security translated into the flow table rules, wherein the SDN controller pushes the flow table rules to one or more routing switches, the flow table rules for performing the network routing and the load balancing.

12. The system of claim 11, wherein one or more of the hardware processors receive from one or more of the components migrated to the target computing environment, performance and utilization information associated with the components running on the target computing environment, and transmit the performance and utilization information to the SDN controller for updating the flow table rules.

13. The system of claim 12, wherein one or more of the hardware processors repeatedly receive the performance and utilization information from one or more of the components migrated to the target computing environment and repeatedly transmit the performance and utilization information to the SDN controller.

14. The system of claim 12, wherein changing customer requirements are received from the components migrated to the target computing environment, wherein the SDN controller updates the flow table rules further based on the changing customer requirements.

15. The system of claim 11, wherein the input data further comprises one or more of a list of load balanced servers, firewall rules, customer requirements, traffic information, server connectivity, network connectivity and quality of service (QoS) requirements.

* * * * *